US012104130B2

(12) United States Patent
Qian et al.

(10) Patent No.: US 12,104,130 B2
(45) Date of Patent: Oct. 1, 2024

(54) CARBON DIOXIDE BUFFER VESSEL PROCESS DESIGN

(71) Applicant: L'Air Liquide, Société Anonyme pour l'Etude et l'Exploitation des Procédés Georges Claude, Paris (FR)

(72) Inventors: Yufeng Qian, Houston, TX (US); Pierre-Philippe Guerif, Houston, TX (US); Alexander Roesch, Houston, TX (US)

(73) Assignee: L'Air Liquide, Societe Anonyme Pour l'Etude et l'Exploitation des Procedes Georges Claude, Paris (FR)

( * ) Notice: Subject to any disclaimer, the term of this patent is extended or adjusted under 35 U.S.C. 154(b) by 969 days.

(21) Appl. No.: 16/951,507

(22) Filed: Nov. 18, 2020

(65) Prior Publication Data

US 2022/0154087 A1 May 19, 2022

(51) Int. Cl.
*C10K 3/06* (2006.01)
*C01B 3/02* (2006.01)
*G05D 11/13* (2006.01)

(52) U.S. Cl.
CPC ............... *C10K 3/06* (2013.01); *C01B 3/02* (2013.01); *G05D 11/132* (2013.01); *C01B 2203/1676* (2013.01); *C01B 2203/168* (2013.01)

(58) Field of Classification Search
None
See application file for complete search history.

(56) References Cited

U.S. PATENT DOCUMENTS

2011/0042619 A1* 2/2011 Morita ................... C01B 3/384
252/373

\* cited by examiner

*Primary Examiner* — Colin W. Slifka
(74) *Attorney, Agent, or Firm* — Elwood L. Haynes

(57) ABSTRACT

A method of maintaining a syngas composition ratio during an upset condition, including detecting a reduction in the import carbon dioxide flow rate with a carbon dioxide import stream flow sensor, evaluating the reduction in carbon dioxide flow rate or carbon dioxide pressure in a controller, performing one or more predetermined corrective actions as instructed by the controller. Wherein the predetermined corrective actions are chosen from the following: opening a CO2 import stream flow valve, opening a hydrocarbon and steam stream feed valve, opening a CO2 backup stream control valve, opening a syngas backup letdown valve, and starting a composition adjustment unit.

11 Claims, 3 Drawing Sheets

CARBON DIOXIDE BUFFER VESSEL PROCESS DESIGN

BACKGROUND

Natural gas may be converted to synthesis gas, or syngas which is a mixture of carbon monoxide and hydrogen. Synthesis gas may then be converted to valuable chemicals, or liquid synthetic fuel or "synfuel". The synfuel has less volume per unit mass (i.e. has a greater density) than the natural gas. Accordingly, it is more economical to transport synfuel than a corresponding amount of natural gas.

One primary method of converting natural gas to syngas is reformer. A reformer needs to import carbon dioxide or have a means of utilizing excess hydrogen, if the product syngas has a lower hydrogen to carbon monoxide ratio. The reformer could be a Steam Methane Reformer (SMR), a Partial Oxidation Reformer (POX), an Auto Thermal Reformer (ATR), or a combination of these reformers.

Carbon monoxide, one of the principal products of a reformer, may be used in many downstream chemical and petrochemical processes. These processes vary in their required ratio of hydrogen to carbon monoxide, but as mentioned above a ratio of 2:1 or lower is very common. On the other hand, as an example, in an SMR, with a natural gas feed and with full carbon dioxide recycle from the process gas only, the lowest hydrogen to carbon monoxide ratio obtainable is about 3. Thus, hydrogen is typically produced far in excess of what is required. Sometimes hydrogen may be used as supplemental fuel to the reformer itself. However, any remainder must be exported, typically merely at fuel value. The potential requirement of valorizing this excess hydrogen introduces a constraint. Also, using a value-added material such as hydrogen to substitute for readily available fuels is typically not the most economical option.

As mentioned above, injecting carbon dioxide into the hydrocarbon feed to the SMR modifies the reaction and effectively reduces the hydrogen to carbon monoxide ratio in the required direction. In addition to recycling carbon dioxide isolated from the syngas, additional carbon dioxide may be obtained from the SMR flue gas or may be imported into the plant.

Obtaining the proper hydrogen to carbon monoxide ratio is dependent upon a steady flowrate of imported carbon dioxide, there exists in the industry a need for a system to react to a reduction or full interruption of this carbon dioxide flow.

SUMMARY

A method of maintaining a syngas composition ratio during an upset condition, including detecting a reduction in the import carbon dioxide flow rate with a carbon dioxide import stream flow sensor, evaluating the reduction in carbon dioxide flow rate or carbon dioxide pressure in a controller, performing one or more predetermined corrective actions as instructed by the controller. Wherein the predetermined corrective actions are chosen from the following: opening a CO2 import stream flow valve, opening a hydrocarbon and steam stream feed valve, opening a CO2 backup stream control valve, opening a syngas backup letdown valve, and starting a composition adjustment unit.

BRIEF DESCRIPTION OF THE FIGURES

For a further understanding of the nature and objects for the present invention, reference should be made to the following detailed description, taken in conjunction with the accompanying drawings, in which like elements are given the same or analogous reference numbers and wherein.

ELEMENT NUMBERS

101=hydrocarbon and steam source
102=CO2 source (import)
103=CO2 buffer tank
104=syngas reactor
105=composition adjustment unit
106=syngas buffer tank
107=syngas end user
108=controller
201=hydrocarbon and steam stream feed valve
202=CO2 import stream flow/pressure control valve
203=CO2 backup stream letdown/control valve
204=syngas flow control valve
205=syngas bypass control valve
206=syngas backup letdown valve
301=CO2 import stream flow sensor
302=CO2 import stream pressure sensor
303=CO2 backup stream flow sensor
304=hydrocarbon and steam feed stream flow sensor
305=crude syngas flow sensor (to composition adjustment unit)
306=crude syngas flow sensor (composition adjustment unit bypass line)
307=syngas backup stream flow sensor
308=syngas flow sensor (to syngas end user)
309=first syngas composition analyzer
310=second syngas composition analyzer
311=CO pressure sensor
312=Syngas pressure sensor

DESCRIPTION OF THE PREFERRED EMBODIMENTS

Figure 1:
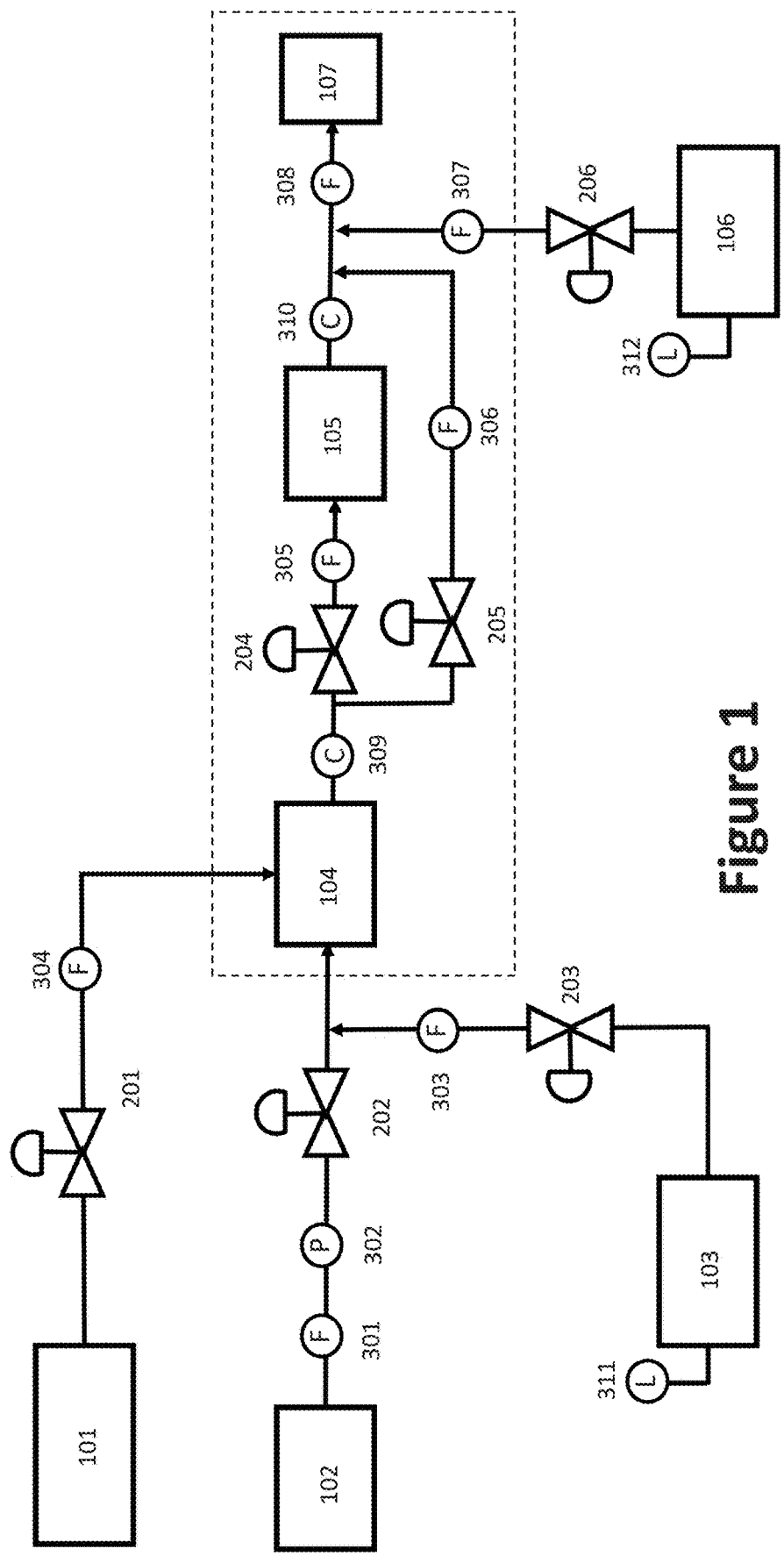
FIG. 1 is a schematic illustration of the basic overall system, in accordance with one embodiment of the present invention.
Figure 2:
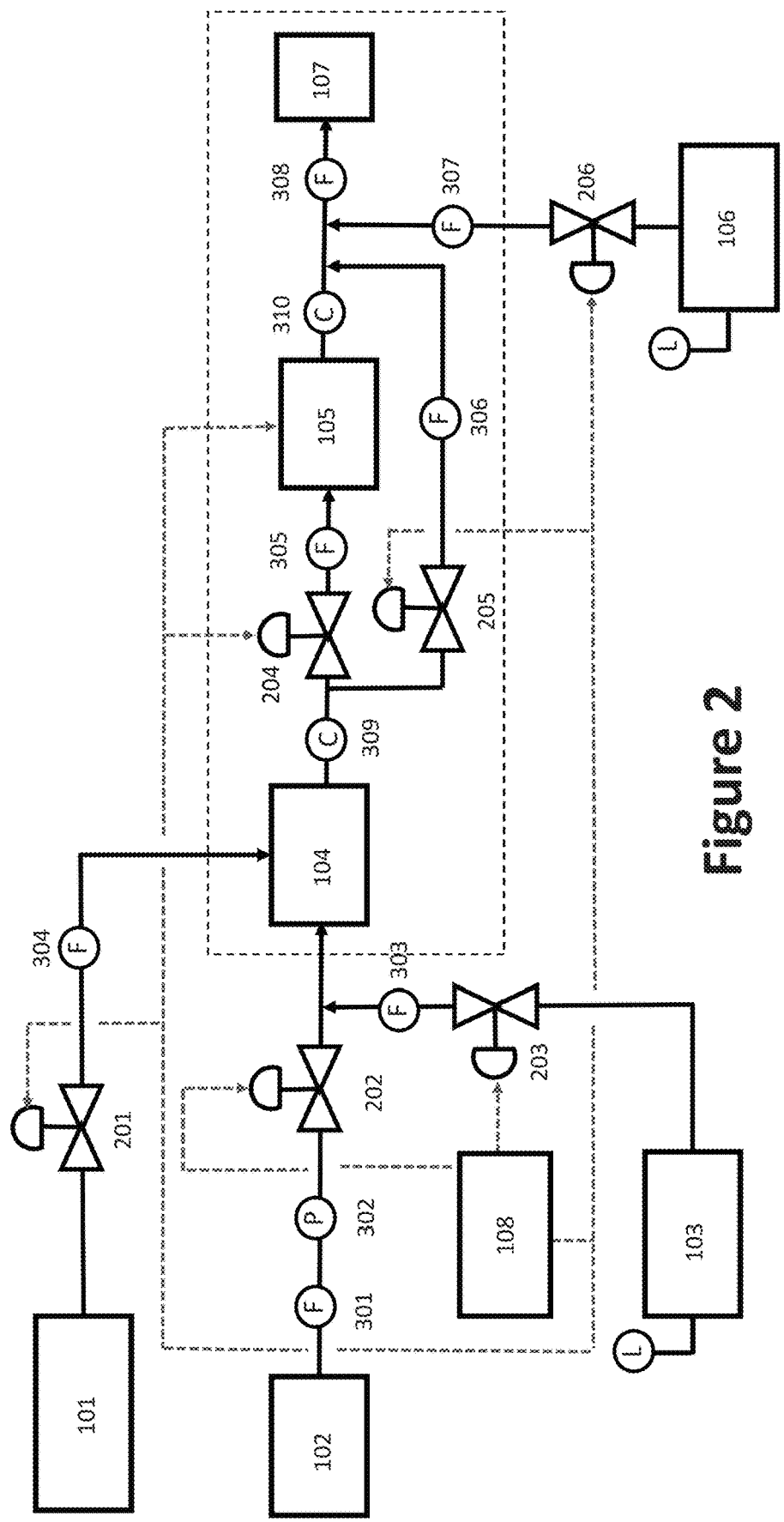
FIG. 2 is a schematic illustration of the controller and the control lines to the various control valves, in accordance with one embodiment of the present invention.
Figure 3:
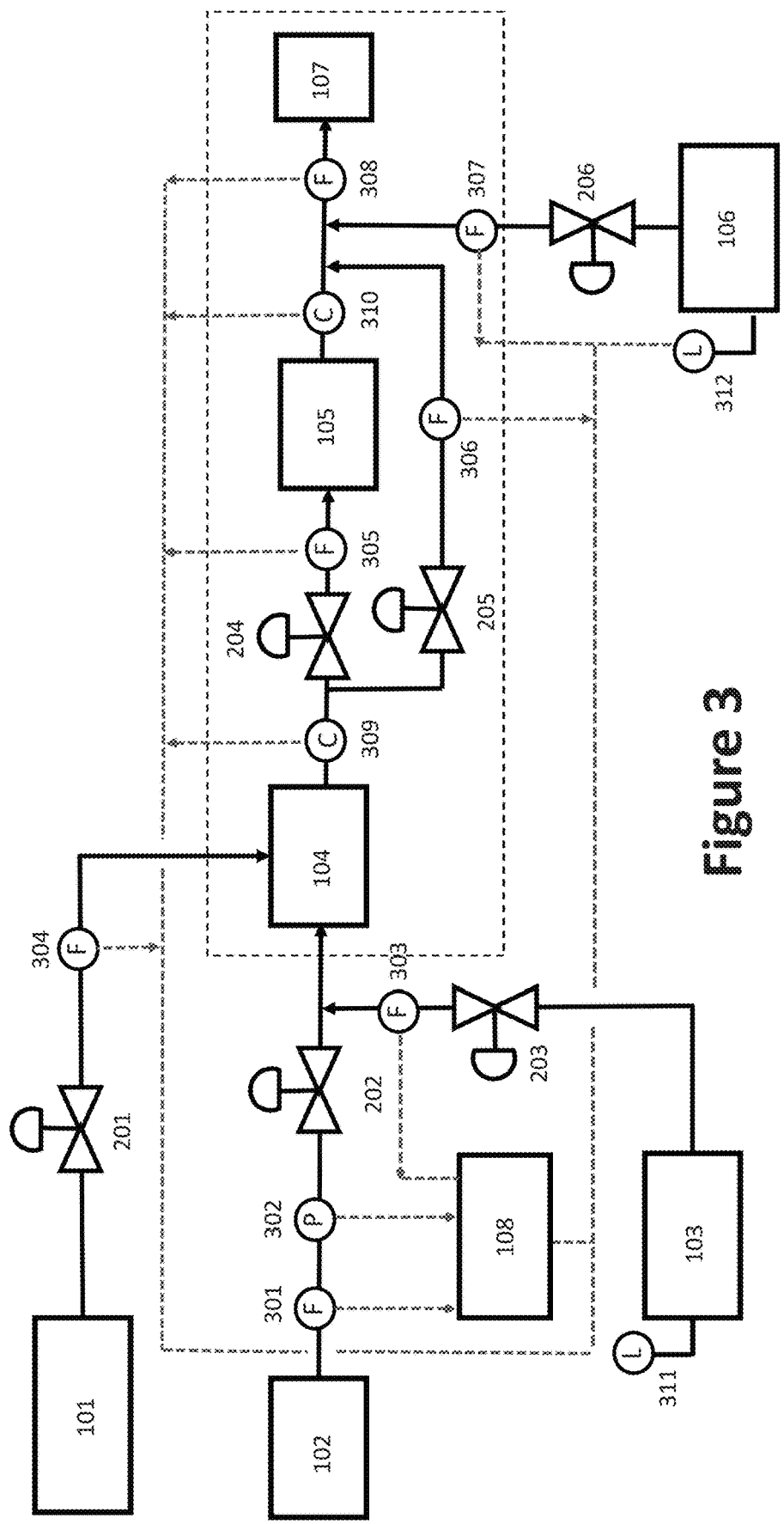
FIG. 3 is a schematic illustration of the control lines from the various sensors to the controller, in accordance with one embodiment of the present invention.

Turning to FIGS. 1-3, a system for reacting to a partial, or complete, interruption of imported carbon dioxide into an SMR plant is presented. FIG. 1 illustrates the basic overall system. FIG. 2 illustrates the controller and the control lines to the various control valves. FIG. 3 illustrates the control lines from the various sensors to the controller.

During normal operation, hydrocarbon and steam from source 101 and CO2 from source 102 are introduced into the system. During normal operation there should be no flow from CO2 buffer tank 103 or syngas buffer tank 106. However, depending on the consistence of the import steam received from CO2 source 102, even during normal operating conditions controller 108 may use CO2 from CO2 buffer tank 103 to maintain a consistent flowrate of CO2.

During normal operation, CO2 backup stream letdown/control valve 203 and syngas backup letdown valve 206 are closed. CO2 import stream flow sensor 301 and CO2 import stream pressure sensor 302 communicate with controller 108 and adjust hydrocarbon and steam stream feed valve 201 and CO2 import stream flow/pressure control valve 202 to adjust the ratios as needed.

The hydrocarbon and steam stream as well as the CO2 import stream are then introduced into syngas reactor 104, wherein these feed streams are converted to syngas. During normal operation, syngas flow control valve 204 will be closed and the composition adjustment unit 105 will be inactive. Consequently, syngas bypass valve 205 will be open and the syngas will bypass composition adjustment unit 105. The syngas will then exit the system and proceed to syngas end use 107.

During an upset condition, when the flowrate of CO2 from source 102 is reduced, in one embodiment of the present invention, CO2 import stream flow sensor 301 communicates this flow reduction to controller 108, which will open CO2 import stream flow/pressure control valve 202 to try to maintain the desired ratio. If this is not sufficient, controller 108 will begin to open CO2 backup stream letdown/control valve 203.

While it is possible to use hydrocarbon and steam stream feed valve 201 to adjust for the reduced CO2 flowrate from source 102, it often results in complex feedback adjustments and is typically not implemented. In theory, when CO2 import flow is reduced, carbon is missing. This can be increased by increasing the flow from hydrocarbon and steam from source 101. In this case, hydrogen atoms will be added, coming from hydrocarbon and steam from source 101, then the steam component should be reduced to compensate. This stream 101 adjustment is not effective after the threshold variance degrades, but it may be the first action taken.

If this is not sufficient, and the threshold variance continues or worsens, controller 108 may activate composition adjustment unit 105. Controller 108 will determine, in real time, when composition adjustment unit 105 must be activated. This may be based on remaining inventory of CO2 buffer tank 103. CO2 buffer tank 103 may have a CO pressure sensor 311 which indicates the inventory in real-time. When a predetermined minimum inventory is approaching, controller 108 will begin activating composition adjustment unit 105. Controller 108 determined the required startup time for composition adjustment unit 105, typically plus some margin. As a non-limiting example, composition adjustment unit 105 may be a membrane system, which may require 10 minutes or more to come fully on-line. In such a situation, the inventory contained within CO2 buffer tank 103, provides sufficient time to bring composition adjustment unit 105 on-line.

Controller 108 may also activate composition adjustment unit 105 if the reduction in the flowrate from CO2 from source 102 exceeds a predetermined threshold. This predetermined threshold may be a 10% reduction in design flowrate. This predetermined threshold may be a 15% reduction in design flowrate. This predetermined threshold may be a 20% reduction in design flowrate. Controller 108 may also activate composition adjustment unit 105 if the CO2 production unit (not shown) sends a signal to the facility that there is an upset.

In another embodiment of the present invention, when a reduction in the flowrate of CO2 from source 102 is detected, controller 108 may open syngas backup letdown valve 206. If the reduction in the flowrate of CO2 from source 102 continues or worsen still further, a plant shutdown will typically commence.

If this is not sufficient, and the threshold variance continues or worsens, controller 108 may activate composition adjustment unit 105. Controller 108 will determine, in real time, when composition adjustment unit 105 must be activated. This may be based on remaining inventory of Syngas buffer tank 106. Syngas buffer tank 106 may have a Syngas pressure sensor 312 which indicates the inventory in real-time. When a predetermined minimum inventory is approaching, controller 108 will begin activating composition adjustment unit 105. Controller 108 determined the required startup time for composition adjustment unit 105, typically plus some margin. As a non-limiting example, composition adjustment unit 105 may be a membrane system, which may require 10 minutes or more to come fully on-line. In such a situation, the inventory contained within Syngas buffer tank 106, provides sufficient time to bring composition adjustment unit 105 on-line.

To summarize, the worst operating scenario is a sudden and complete loss of CO2 from CO2 source 102. In this case, in order to maintain the desired, or required, specifications for the syngas exiting the system, and simultaneously to gain time for safe turndown/shut down, typically it is at least initially desirable to have the on spec syngas composition at a reduced flow rate. Composition Adjustment unit 105 is designed to maintain the composition of the produced syngas at the required specifications.

However, as soon as CO2 import stream flow sensor 301 indicates a sudden reduction in imported CO2 flowrate, controller 108 activates Composition Adjustment unit 105. Simultaneously syngas bypass valve 205 is gradually closed, as Adjustment unit 105 comes online. In the meantime, Controller 108 immediately, and quickly, opens CO2 import stream flow/pressure control valve 202 to a predetermined position, to at least partially makeup the CO2 flow from CO2 source 102.

It is desirable to store the CO2 in CO2 buffer tank 103 at supercritical condition and to maintain the CO2 dozens of degree C. above critical temp, to make sure the makeup CO2 is in gas phase after letdown to avoid damage to Syngas Reactor 104. As an example, the CO2 stored in CO2 buffer tank 103 may be maintained at 132 barG and 90 degree C. When the CO2 is let down to 62 barG at point of use, the CO2 temperature will drop to 44 degree C. due to Joule-Thompson Effect. However, this temperature is still above the critical temperature of CO2, which is 31.1 degree C. And thus, the CO2 remains in the gas phase. In another example, if CO2 buffer tank 103 is maintained at 132 barG and 40 degree C., after letdown to 62 barG, the temperature will drop to 24 degree C., and thus become about 91% liquid. This two-phase flow makes piping design difficult, costly and impossible to directly feed to reactor. The advantage of maintaining CO2 tank 103 in an elevated temperature to achieve gas phase after letdown is to avoid a costly and complicated CO2 vaporizing system. When the CO2 point of use may only accept gas phase. Maintaining the CO2 buffer tank 103 at 90 degree C. is relatively easy to accomplish, as there are many methods known in the art, such as heat tracing, space heater or heat exchanger. It is also an economical solution since the CO2 tank 103 which is typically manufactured of carbon steel will not need any special design or thicker wall, due to carbon steel allowable strength does not reduce at 90 degree C.

When CO2 buffer tank 103 is depleted, a replenishing system may be used to refill the buffer tank. This system (not shown) may include a compressor and an impurity clean up system. The CO2 source could be from source 102, or any other suitable CO2 source.

Simultaneously, Controller 108 may open hydrocarbon and steam stream feed valve 201 to increase hydrocarbon and steam flow rate to mitigate any syngas flow and composition fluctuation. Controller 108 may also open the syngas backup letdown control valve 206 to mitigate any syngas flow fluctuation.

The optimization of controller 108 may depend on the requirement of the project such as minimum required syngas production flow rate, the max allowed deviation of the syngas composition, the required minimum safety shut down time of syngas end user 107. The optimization of controller 108 may depend on the selection and design of multiple units, such as the size and startup speed of Composition Adjustment Unit 105, the size of CO2 buffer tank 103, the size of syngas buffer tank 106, and the capacity margin of syngas reactor 104.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method of maintaining a syngas composition ratio during an upset condition, comprising:
   detecting a reduction in the import carbon dioxide feed stream flow rate with a carbon dioxide import stream flow sensor,
   detecting reduction in carbon dioxide pressure with a carbon dioxide pressure sensor,
   evaluating the reduction in carbon dioxide flow rate or carbon dioxide pressure in a controller,
   performing one or more predetermined corrective actions as instructed by the controller,
   wherein the predetermined corrective actions are chosen from a list consisting of:
   opening a carbon dioxide import stream flow valve,
   opening a hydrocarbon and steam stream feed valve,
   opening a carbon dioxide backup stream control valve,
   opening a syngas backup letdown valve, and
   starting a composition adjustment unit,
   wherein the composition adjustment unit comprises a membrane separation unit, and wherein the composition adjustment unit is started when there is about 10 minutes of remaining carbon dioxide inventory, and
   wherein the composition adjustment unit is then started based on the remaining carbon dioxide inventory.

2. The method of claim 1, wherein the carbon dioxide import stream flow sensor, the carbon dioxide import stream flow valve, the hydrocarbon and steam stream feed valve, the carbon dioxide backup stream control valve, the syngas backup letdown valve, and the composition adjustment unit are operationally connected to the controller.

3. The method of claim 1, wherein the carbon dioxide backup stream control valve is opened first, then the composition adjustment unit is then started.

4. The method of claim 1, wherein a syngas stream generated by a syngas reactor bypasses the composition adjustment unit 105 from the time that the composition adjustment unit is started, until the composition adjustment unit is on-line.

5. The method of claim 1, wherein the carbon dioxide buffer tank maintains the carbon dioxide inventory at supercritical conditions.

6. The method of claim 1, wherein the syngas backup letdown valve 206 is opened first, then the composition adjustment unit 105 is then started.

7. The method of claim 6, wherein a Syngas buffer tank 106 comprises a Syngas pressure sensor 312, and wherein the composition adjustment unit 105 is then started based on the remaining Syngas inventory.

8. The method of claim 7, wherein the composition adjustment unit 105 comprises a membrane separation unit, and wherein the composition adjustment unit 105 is started when there is about 10 minutes of remaining Syngas inventory.

9. The method of claim 8, wherein a syngas stream generated by a syngas reactor 104 bypasses the composition adjustment unit 105 from the time that the composition adjustment unit 105 is started, until the composition adjustment unit 105 is on-line.

10. The method of claim 7, wherein the Syngas buffer tank 103 maintains the CO inventory at supercritical conditions.

11. The method of claim 1, wherein once the composition adjustment unit is on-line, the carbon dioxide backup stream control valve and the syngas backup letdown valve are closed.

* * * * *